United States Patent [19]

Muratani et al.

[11] Patent Number: 4,731,866
[45] Date of Patent: Mar. 15, 1988

[54] TRANSMISSION POWER CONTROL SYSTEM IN A SATELLITE COMMUNICATION

[75] Inventors: Takurou Muratani, Kanagawa; Tatsuo Watanabe; Hideo Kobayashi, both of Tokyo, all of Japan

[73] Assignee: Kokusai Denshin Denwa Co., Ltd., Tokyo, Japan

[21] Appl. No.: 893,529

[22] Filed: Aug. 6, 1986

[30] Foreign Application Priority Data

Sep. 12, 1985 [JP] Japan .................. 60-200517

[51] Int. Cl.⁴ .......................... H04B 7/185
[52] U.S. Cl. ...................... 455/9; 455/10; 455/12; 455/52; 455/69
[58] Field of Search .............. 455/9, 10, 12, 52, 69

[56] References Cited

U.S. PATENT DOCUMENTS 3,315,164 4/1967 Ferguson, Jr. et al. .......... 455/69
4,228,538 10/1980 Scharla-Nielsen et al. ....... 455/9
4,309,764 1/1982 Acampora ..................... 455/12

FOREIGN PATENT DOCUMENTS 200640 11/1983 Japan ........................ 455/10

OTHER PUBLICATIONS

"Power Control for Satellite Transponder", by Kunzinger, IBM Technical Disclosure Bulletin, vol. 25, No. 9, 2/1983.

Primary Examiner—Michael A. Masinick
Attorney, Agent, or Firm—Armstrong, Nikaido, Marmelstein & Kubovcik

[57] ABSTRACT

A satellite communication system between small earth stations through a satellite and a relay earth station. The relay earth station has a larger antenna and a higher power transmitter than those of a small earth station in order to regenerate received digital signals. The transmission power of the relay earth station is controlled according to rain attenuation between the satellite and the small earth station, and/or rain attenuation between the satellite and the relay earth station, so that rain attenuation is compensated by increasing the transmission power of the relay earth station.

5 Claims, 6 Drawing Figures

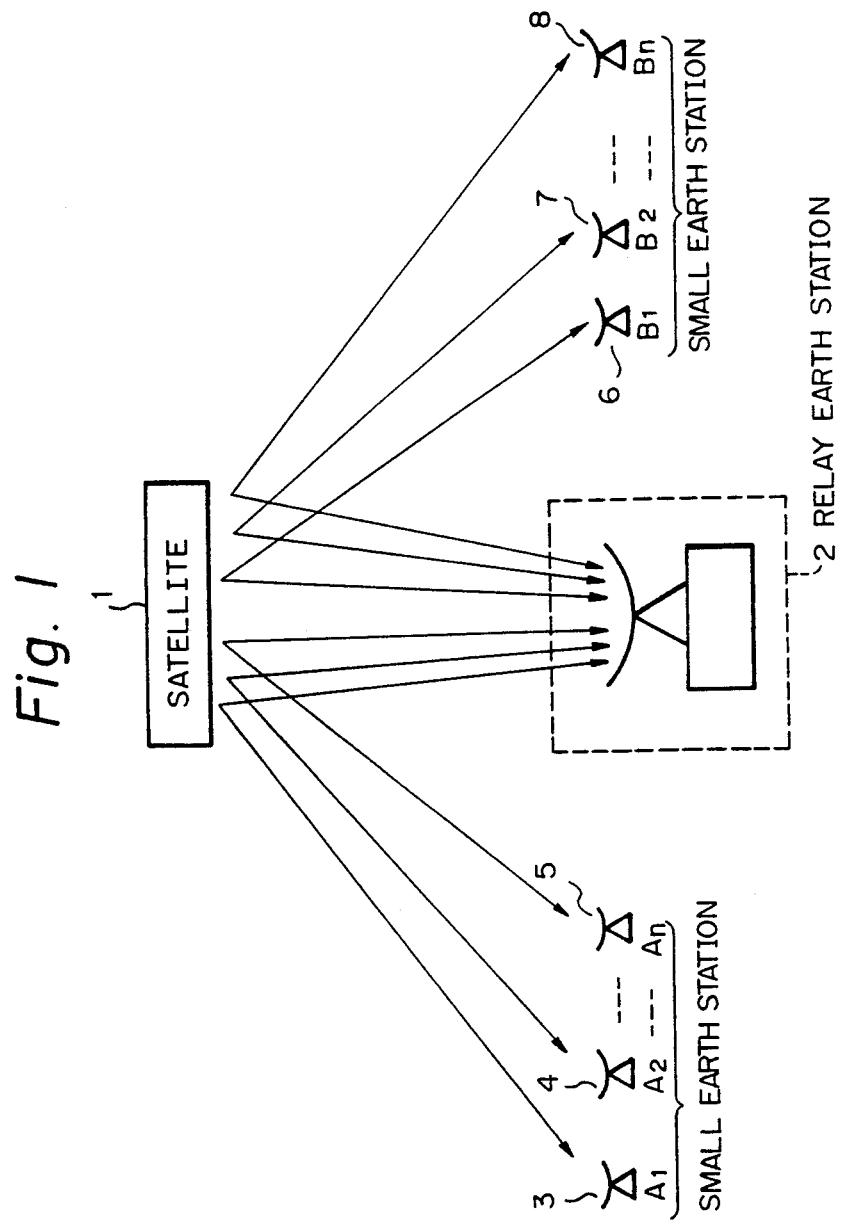

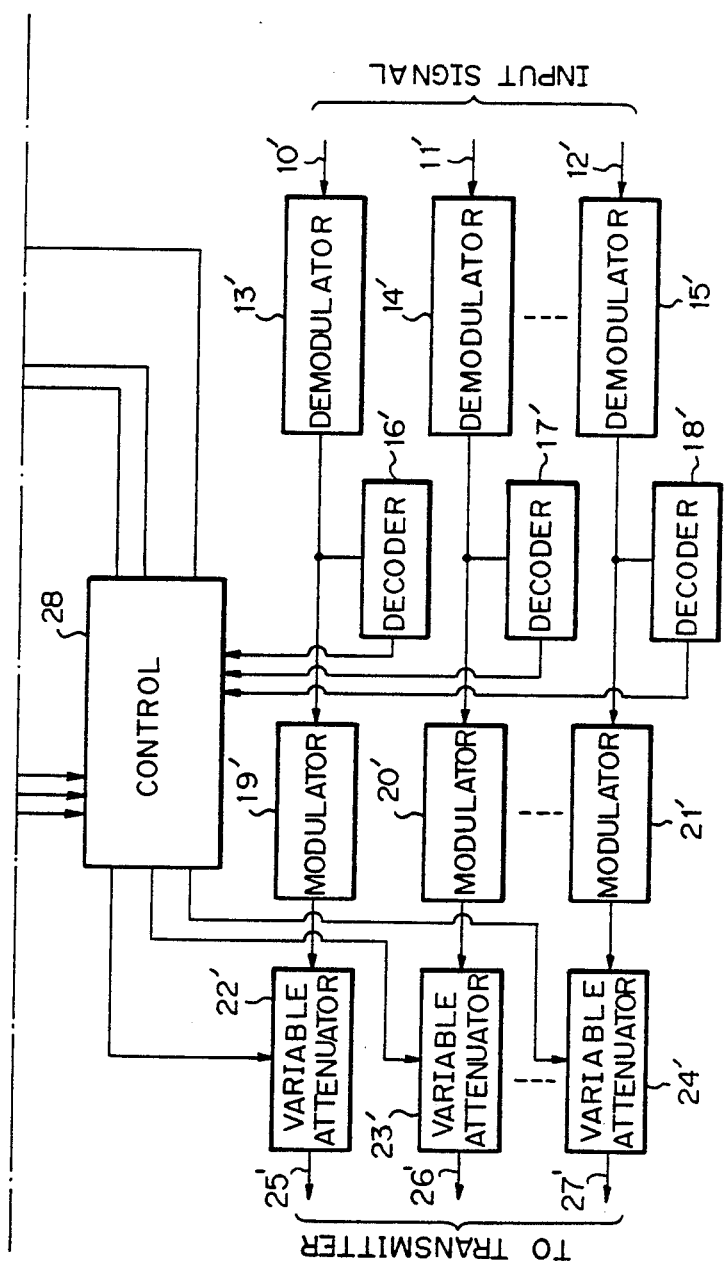

TRANSMISSION POWER CONTROL SYSTEM IN A SATELLITE COMMUNICATION

BACKGROUND OF THE INVENTION

The present invention relates to a transmission power control system in a digital satellite communication system, in particular, relates to such a transmission power control system which is used for a communication between small earth stations or micro-terminals.

A satellite communication system using a small earth station, or a micro-terminal, is promising due to the latest development of a large communication satellite, the latest development of digital communication system, and/or the latest development of a communication element. In particular, the Ku band (11/14 GHz) is preferable for future small earth stations satellite communication, in view of the low communication cost.

When the frequency higher than 10 GHz is used in a satellite communication system, the rain attenuation is a big problem in circuit management. In particular, when a small earth station which has a low elevation angle is used, that rain attenuation problem is serious and must be solved.

Conventionally, the solution for rain attenuation is space diversity system, or transmission power control system.

In a space diversity system, a pair of spaced two antennas is installed so that received signals at both antennas are not affected by rain simultaneously, and the antenna which is less affected by rain is selected for an actual circuit.

In a conventional transmission power control system, a transmission power of a transmitter is controlled based upon a level of reception signal, such as a beacon signal.

The former space diversity system becomes very costly due to the duplex system. It should be noted that a small earth station communication system must provide cheap communication.

The latter transmission power control system of a prior art has the following disadvantages.

(a) A transmitter installed in a small earth station has usually not enough surplus power for power control. Therefore, the range of the control is small.

(b) Several hundred small earth stations share a common transponder on a satellite, the transmission power for each channel is very small, and therefore, a circuit is damaged by rain attenuation of a downward circuit.

Accordingly, a conventional technique for solution of rain attenuation can not be applied to a small earth station communication, directly.

SUMMARY OF THE INVENTION

It is an object, therefore, of the present invention to overcome the disadvantages of a prior small earth station communication system by providing a new transmission power control system.

The above and other objects are attained by a transmisson power control in a satellite communication system which has a plurality of small earth stations, a satellite, and a relay earth station which has a larger antenna and a higher transmitter than those of the small earth stations. Digital communication between the small earth stations is performed through the satellite and the relay earth station which regenerates received digital signal. Each of the small earth stations measures rain attenuation in a down link from the satellite to the small earth station. The small earth station sends information of rain attenuation with the digital signal in the up circuit to the relay earth station. The relay earth station controls transmission power to the small earth station according to the information of rain attenuation received from the small earth station.

BRIEF DESCRIPTION OF THE DRAWINGS

The foregoing and other objects, features, and attendant advantages of the present invention will be better understood by means of the following description and accompanying drawings wherein;

FIG. 1 is a block diagram of the satellite communication system according to the present invention, FIGS. 2A and 2B are a block diagram of the transmission power control circuit in a relay earth station according to the present invention.

DESCRIPTION OF THE PREFERRED EMBODIMENTS

Figure 2A:
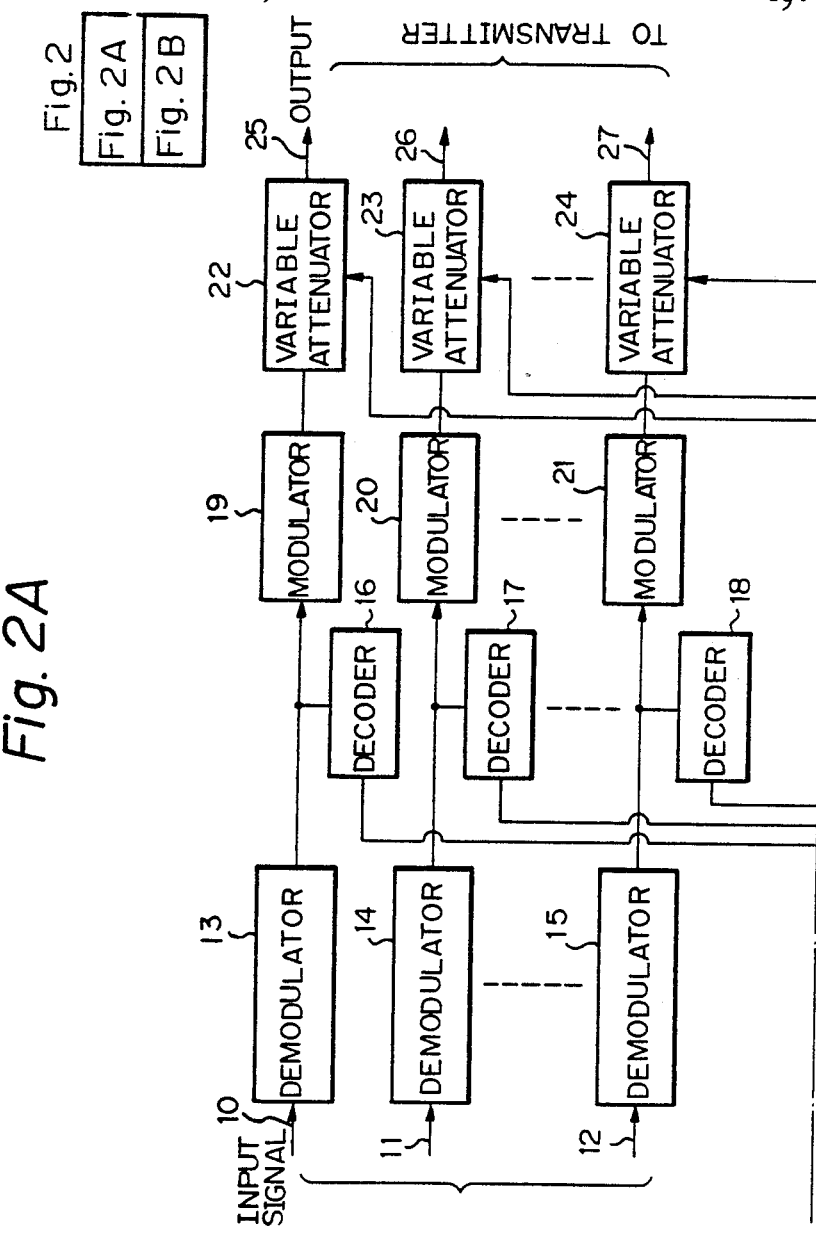

FIG. 1 shows a block diagram of the satellite communication system according to the present invention. In the figure, the numeral 1 is a satellite, 2 is a relay earth station, and 3 through 8 are small earth stations. The circuit from an earth station to a satellite is called an "up-link", and a circuit from a satellite to an earth station is called a "down-link".

It is supposed that the relay earth station is located apart from the earth stations so that the relay earth station does not suffer from rain attenuation simultaneously with a small earth station.

It is assumed that communication between small earth stations through a satellite is provided with a single channel per single carrier system.

The configuration of FIG. 1 which has a relay earth station, and the communication between earth stations is effected through two-hops propagation, has the advantage that a signal to noise ratio (C/N) may be large, as compared with a single hop propagation communication system. Because, a relay earth station which has a larger antenna, and a larger transmitter than those of a small earth station, the relay earth station can regenerate a received digital signal. A repeater in that relay earth station can repeat all the signals through multiplexing technique. Therefore, the present invention uses the two-hops propagation system.

In FIG. 1, the relay earth station 2 receives each signal from each small earth stations 3 through 8, and demodulates the reception signals. Then, the relay earth station 2 modulates the demodulated signals, and the modulated signal is transmitted to the satellite 1. Although FIG. 1 shows the embodiment which has a single satellite 1, the system may have two satellites so that the first group of small earth stations 3 through 5 are coupled with the first satellite, the second group of earth stations 6 through 8 are coupled with the second satellite, and the relay earth station 2 which has two antennas is coupled with both the first satellite and the second satellite.

It should be noted that a down-link is more severe than an up-link, that is to say, an up-link has a larger margin than that of a down-link, because, the transmission power by a satellite for each channel is small, and an antenna gain of a small earth station is also small. On the other hand, as for an up-link margin, a small earth station, which has a semiconductor solid state transmitter, has a power amplifier larger than several watts, and the transmission power for each channel by a small earth station may be larger than that of a satellite. Accordingly, a down-link is deteriorated more deeply than an up-link by rain attenuation.

The essential transmission power by a satellite depends upon an output of a transponder on a satellite, and a gain of a transmission antenna on a satellite. When a transponder amplifies a multiplexed signal, it has some back-off which is the difference between a saturate output power of a transponder and an actual output power of the transponder, because if the transponder operates close to the saturation output power, it generates undesirable non-linear distortion and/or cross modulation.

When the maximum output power of a transponder is $P_m$ (dB W), and the back-off is x (dB), the actual output power $P_{so}$ when all the channels are in operation is shown below.

$$P_{so} = P_m - x (dB\ W) \quad (1)$$

The power for each channel in the equation (1) is $P_{so} - 10 \log N$ (dB W). In a circuit design of a satellite communication circuit, a small earth station (in which output transmission power, antenna gain et al are small), and a communication system are determined so that the reception signal by a small earth station satisfies the requirement under the condition of equation (1).

When an antenna gain of a transmission antenna in a relay earth station is $G_{rt}$, the transmission power $P_{rt}$ of a relay earth station for obtaining $P_{so}$ when a small earth station operates is as follows.

$$P_{rt} = P_i + 10 \log N - (G_{rt} - G_{st})\ (dB\ W) \quad (2)$$

where $P_i$, and $G_{st}$ are an output transmission power (dB W) of a small earth station, and an antenna gain of a small earth station, respectively.

It should be noted that the maximum output power $P_{rtmax}$ of a relay earth station may be considerably larger than $P_{rt}$, because the relay earth station may install a large antenna and a high power transmitter. Accordingly, the transmission power control is effected by increasing (or decreasing) the output power of the relay earth station for the particular small earth station, so that a down-link to the particular small earth station which is subject to rain attenuation is improved.

It should be appreciated that the number M, which requires the transmission power control due to rain attenuation, is small as compared with the total number N of the small earth stations, because the small earth stations are distributed over a wide area on the earth, and it is rare that all the small earth stations suffer from rain attenuation simultaneously.

When the relay earth station increases the output power y times for M number of channels, the input level to a transponder on a satellite increases by (K) times as compared with that which is free from power control.

$$(K) = \frac{P_i[(N - M) + yM]}{P_i N} = 1 + (M/N)(y - 1) \quad (3)$$

When an input-output characteristic of a transponder is almost linear with x dB of output back-off, and the output back-off of a transponder when $(K) \neq 0$ is $x'$ dB, the equation (3) shows that the decrease of the back-off of the transponder is 10 log (K) dB, or (x'-x) dB. For instance, when y is 10 dB, the number of channels N is 400, and 10 log (K)=1 dB, the value M is 11. Similarly, when 10 log (K)=2 dB, the value M is 26.

In an actual circuit, the amount of the control (y) is usually less than 10 dB. Therefore, the transmission power control of 20–30 number of small earth stations is possible merely by decreasing the output back-off by 1 dB. and, it should be appreciated that the decrease of the output power back-off by only 1 dB does not influence the circuit quality, and is tolerable. In other words, the transmission power control of several percent of small earth stations among all the earth stations is possible without affecting the operation of a transponder on a satellite. The actual situation would be better than this assumption, since it is rare that all the N number of circuits are in operation simultaneously.

FIGS. 2A and 2B show a block diagram of a transmission power control circuit in a relay earth station. In FIGS. 2A–2B, the numerals 10 through 12, and 10' through 12' are input signals of each channels, 13 through 15 and 13' through 15' are demodulators, 16 through 18 and 16' through 18' are decoders, 19 through 21 and 19' through 21' are modulators, 22 through 24 and 22' through 24' are variable attenuators, and, 25 through 27 and 25' through 27' are output signals of each channels. The numeral 28 is a control circuit for controlling the variable attenuators.

It is assumed that the small earth station A₁ (3) in FIG. 1 sends the signal and provides the signal 10 in FIG. 2, and the destination earth station is B₁ (6) in FIG. 1. It is also assumed that the transmission path between the satellite 1 and the small earth station A₁ (3) is subject to rain attenuation. The input signal 10 in the relay earth station is demodulated by the demodulator 13 to a digital baseband signal, which is applied to the decoder 16 and the modulator 19.

Figure 3:
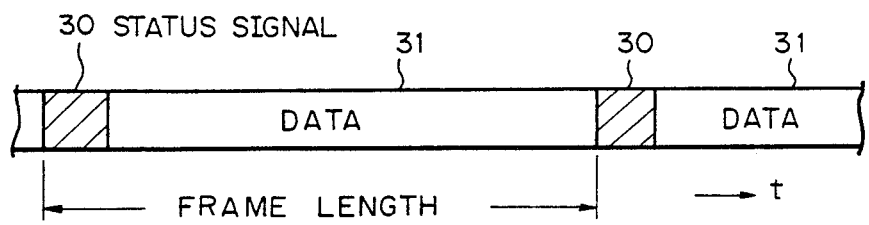
FIG. 3 is a signal format of a base band signal according to the present invention.

The format of the baseband digital signal is shown in FIG. 3, in which the numeral 30 is a status signal, and 31 is a data signal. The status signal 30 has information for advising the operation status of an originating small earth station to a destination earth station and a relay earth station, and that status signal 30 includes rain attenuation information which is measured by using for instance a beacon signal at a small earth station.

The output of the modulator 19 in FIG. 2 is sent to the destination earth station B₁ (6) in FIG. 1 through the variable attenuator 22, a transmitter (not shown), and a satellite, and the output of the decoder 16 in FIG. 2 is applied to the control circuit 28.

The transmission signal of the destination small earth station B₁ (6) is received by the relay earth station as the input signal 10', which is demodulated by the demodulator 13'. The output of the demodulator 13' is modulated by the modulator 19'. The output of the modulator 19' is sent to the originating small earth station A₁ (3) through the variable attenuator 22', a transmitter (not shown), and a satellite.

As the transmission path between the satellite and the small earth station A₁ (3) suffers from rain attenuation, the information of the amount of the rain attenuation measured by the small earth station is included in the decoder 16 in FIG. 2. The control circuit 28 controls the variable attenuator 22' so that the attenuation of the variable attenuator 22' decreases according to the output information of the decoder 6. The control range of a variable attenuator is usually larger than the control range of a transmission power. And an, upper limit of transmission power of a relay earth station when rain attenuation is compensated must be restricted so that a transponder of a satellite does not exceed a predetermined value, or does not saturate.

A modification of the embodiment of FIG. 2 is possible to those skilled in the art. For instance, the embodiment of FIG. 2 has a plurality of decoders for each channel. A single decoder which decodes all the channels in time divisional operation can replace the decodes of FIG. 2.

The measurement of rain attenuation at a small earth station may be carried out by using a circuit control channel from a relay earth station. A demand assignment communication system is usually used for communications including small earth stations so that a circuit efficiency is high. In a demand assignment system, a circuit is established only when a call exists. In communication between small earth stations through a relay earth station, when a small station has a call, the small earth station asks a relay earth station to establish a circuit through a random access method. Then, the relay earth station informs the destination earth station of the information for establishing a circuit (for instance, a circuit number to be established) through the circuit control channel. Therefore, the circuit control channel which transmits the continuous signal is always received by all the small earth stations. A small earth station may take rain attenuation information by measuring reception level of the circuit control channel. For instance, a carrier to noise ratio (C/N) of the circuit control channel is measured at each small earth station.

Figure 5:
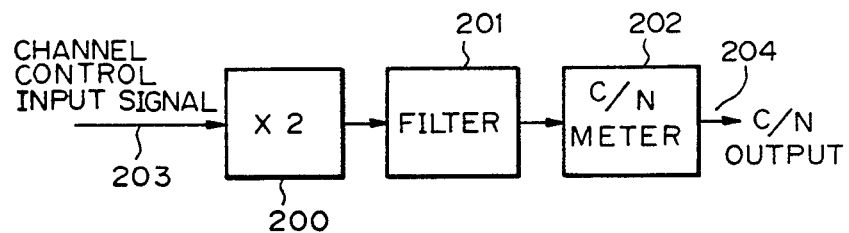
FIG. 5 is a block diagram of a measurment circuit of signal to noise ratio.

FIG. 5 shows a block diagram of measurement circuit of the C/N. In the figure, the channel control input signal 203 is assumed to be a two phase PSK (phase shift keying) signal. That signal is applied to the C/N meter 202 through the frequency doubler 200 and the filter 201. The input signal of the C/N meter is a non-modulated signal, and therefore, the C/N output 204 is easily measured.

The above description concerns the compensation for rain attenuation at a small earth station. It should be noted of course that not only a small earth station but also a relay earth station suffer from rain attenuation. In case of a relay earth station, transmission power by the relay earth station is controlled, since the relay earth station has enough margin for the decrease of the C/N of the reception signal. When the up-link from the relay earth station is attenuated by rain attenuation, the whole system (including all the small earth stations) stops, since transmission power by a satellite is limited.

Therefore, the relay earth station measures the rain attenuation by the C/N of the reception signal of the beacon signal from the satellite, then, the rain attenuation in an up-link is calculated by the frequency ratio of the up-link and the down-link. The transmission power of the relay earth station is adjusted according to the calculated rain attenuation of the up-link.

When a relay earth station suffers from rain attenuation, and a small earth station also suffers from rain attenuation, the transmission power control should be effected for both the relay earth station and the small earth station. When the relay earth station increases the transmission power for all the channels by 5 dB, and the small earth station $A_1$ (3) is controlled by 3 dB, the total control amount is 8 dB. Therefore, the attenuation by the variable attenuator 22' in FIG. 2 decreases by 8 dB.

Figure 4:
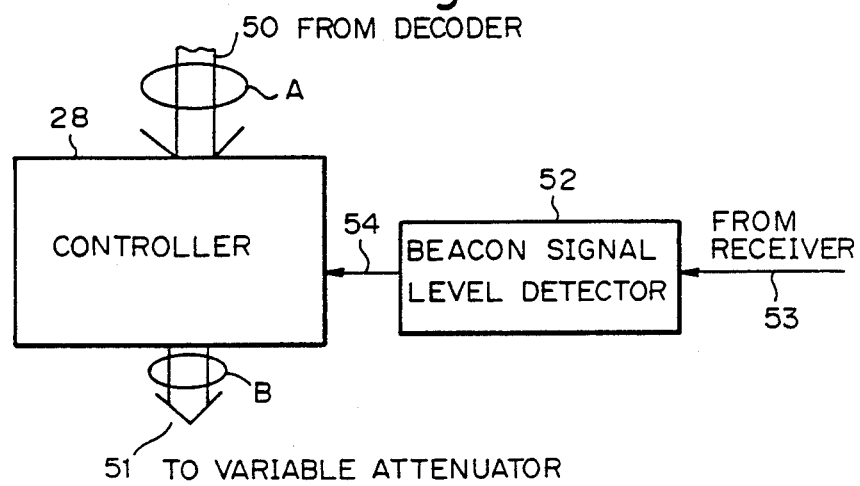
FIG. 4 is a block diagram of a control circuit 28 in FIG. 2B.

FIG. 4 shows a block diagram of the control circuit 28 in FIG. 2. That circuit accomplishes the control of both the relay earth station, and small earth stations. In the figure, the numeral 50 is a bus having the information of rain attenuation from a small earth station, 51 is a control information bus for controlling transmission power to a small earth station. The bus 51 has the information of adjustment of a variable attenuator. The numeral 52 is a level detector of a beacon signal, 53 is an output signal from a receiver, and 54 is an output signal of the detected beacon signal. The rain attenuation is the difference between the beacon signal level (or C/N of the beacon signal) when it is fine, and the detected beacon signal level (or the C/N). A micro processor (not shown) included in the control circuit 28 takes the control amount of the transmission power for each channel on a time divisional basis.

The present invention is applicable not only to a communication system which has a relay earth station, but also a communication system which has no relay earth station. When no relay earth station is installed, a reception small earth station must interprete a reception data of rain attenuation, and a small earth station must have some margin of transmission power.

Some modification of FIG. 1 is possible. FIG. 1 shows the embodiment that the communication is effected between a small earth station in the group A, and another small earth station in the group B. The communication between two small earth stations which belong to the common group is of course possible. Further, more than two satellites can be used in a communication system, when a relay earth station can access two satellites.

Further, the present invention is application to the communication between a large earth station and a small earth station. When a direct access to a central station by using a land line is difficult because of geographical condition, or satellite communication is cheaper than a land line communication, the communication between a large earth station and a small earth station is advantageous. In that case, a central earth station has the function of a relay earth station described in this specification.

As described above in detail, according to the present invention, the compensation for rain attenuation is centralized in a relay earth station. Therefore, each of small earth stations may be simple in structure, and each small earth station does not need to consider rain attenuation.

From the foregoing it will now be apparent that a new and improved transmission power control system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A transmission power control system in a satellite communication system comprising:
   a plurality of small earth stations;
   a satellite; and
   a relay earth station which has larger antenna and a higher power transmitter than antennas and transmitters of said small earth stations, so that digital communication between said small earth stations is performed through said satellite and said relay earth station, said relay earth station regenerates received digital signals, each of said small earth stations measures rain attenuation in a down link from the satellite to the small earth stations, and sends information about rain attenuation in an up link from each small earth station to the satellite based upon measured data in the down link, said small earth station sending the information about rain attenuation in the up link to the relay earth station together with the transmission signal, the relay earth station controls transmission power to said small earth station according to the rain attenuation information received from each said small earth station, so that resin attenuation at the small earth station is compensated 2. A transmission power control system according to claim 1, wherein said relay earth station measures rain attenuation in the down link from the satellite to the relay earth station by measuring one of C/N and reception level of one of a beacon signal and data signal from the satellite, calculates rain attenuation in the up link according to said rain attenuation in the down link and controls transmission power of the relay earth station according to the calculated rain attenuation in the down link so that rain attenuation at the relay earth station in the up link is compensated.

3. A transmission power control system according to claim 1, wherein upper limit of transmission power of said relay earth station is restricted so that a transponder of the satellite does not exceed a predetermined value.

4. A transmission power control system according to claim 1, wherein said relay earth station comprises a transmission power control circuit.

5. A transmission power control system according to claim 4, wherein said transmission power control circuit comprises a plurality of demodulators receiving input signals from said plurality of small earth stations, said demodulators demodulating said input signals;

a plurality of modulators, connected to said demodulators, for modulating said demodulated input signal;

a plurality of decodes, connected to said demodulators, for decoding said demodulated input signal;

a control circuit connected to said decoders; and a plurality of variable attenuation connected to said control circuit and said modulators, and variable attenuators outputting said modulated signal from said modulators based on said control circuit so that an attenuation of said variable attenuators varies according to said decoded signal from said decoder.

* * * * *

UNITED STATES PATENT AND TRADEMARK OFFICE
CERTIFICATE OF CORRECTION

PATENT NO. : 4,731,866
DATED : March 15, 1988
INVENTOR(S) : Takurou MURATANI et al It is certified that error appears in the above-identified patent and that said Letters Patent is hereby corrected as shown below:

Claim 1, column 7, line 14, "resin" should read --rain--.

Signed and Sealed this

Sixth Day of June, 1989

Attest:

DONALD J. QUIGG

Attesting Officer

Commissioner of Patents and Trademarks